United States Patent [19]

Bond et al.

[11] Patent Number: 4,562,495
[45] Date of Patent: Dec. 31, 1985

[54] MULTIPLE SYSTEM DISK

[75] Inventors: Charles R. Bond, Milpitas; Ronald M. Sturtevant-Stuart, San Francisco, both of Calif.

[73] Assignee: Verbatim Corporation, Sunnyvale, Calif.

[21] Appl. No.: 627,238

[22] Filed: Jul. 2, 1984

[51] Int. Cl.[4] .................... G11B 23/36; G11B 27/32; G11B 31/00; G11B 21/08
[52] U.S. Cl. ........................... 360/78; 360/69; 360/135
[58] Field of Search .............. 360/60, 69, 78, 133, 360/135; 364/191; 369/28, 47

[56] References Cited

U.S. PATENT DOCUMENTS

| 4,016,603 | 4/1977 | Ottesen ........................ 360/135 |
| 4,321,635 | 3/1982 | Tsuyuguchi ................. 360/72.2 |
| 4,338,644 | 7/1982 | Staar ............................ 360/132 |
| 4,507,693 | 3/1985 | Matsuda et al. .............. 360/72.2 |

OTHER PUBLICATIONS

IBM Technical Disclosure Bulletin, vol. 23, No. 2, Jul. 1980, pp. 554–555, Hybrid Storage Disks, Iseminger et al.

*Primary Examiner*—George G. Stellar
*Attorney, Agent, or Firm*—Thomas E. Schatzel

[57] ABSTRACT

A multiple system data storage disk adapted for use with more than one type of computer. The disk is specially formatted to include software for each computer. The disk includes four discrete recognition headers, one for each target computer, placed at locations on the disk where each computer expects to being its data loading operation. Each header further includes software directing the computer to step out to a discrete group of data tracks located elsewhere on the disk. Each data track group contains an identical program, written in each target computer's language. The disk is suited to video games for multiple computers. An alternative embodiment of the disk includes a header or headers containing a magnetic signature for copy protection. A disk can be produced with twenty-four such headers, one for each type of computer on the market, which can be mass produced to provide low-cost copy protection for all machines.

14 Claims, 3 Drawing Figures

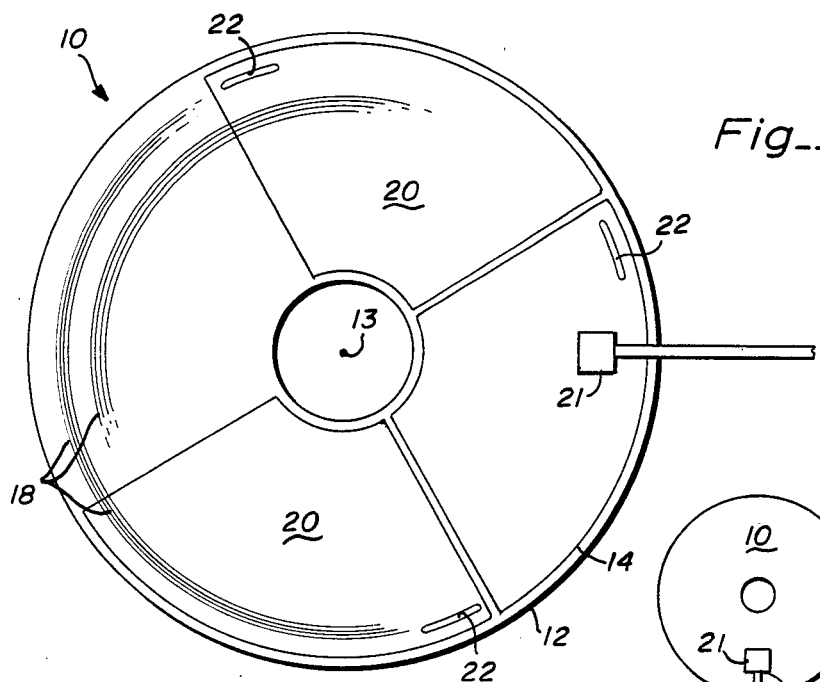
Fig_1
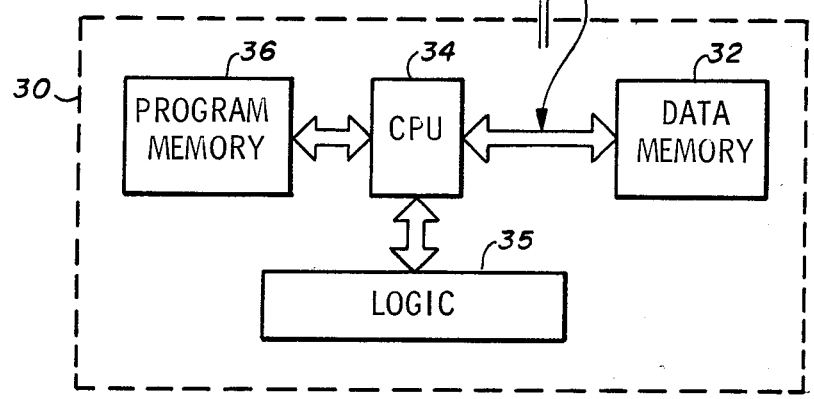
Fig_2
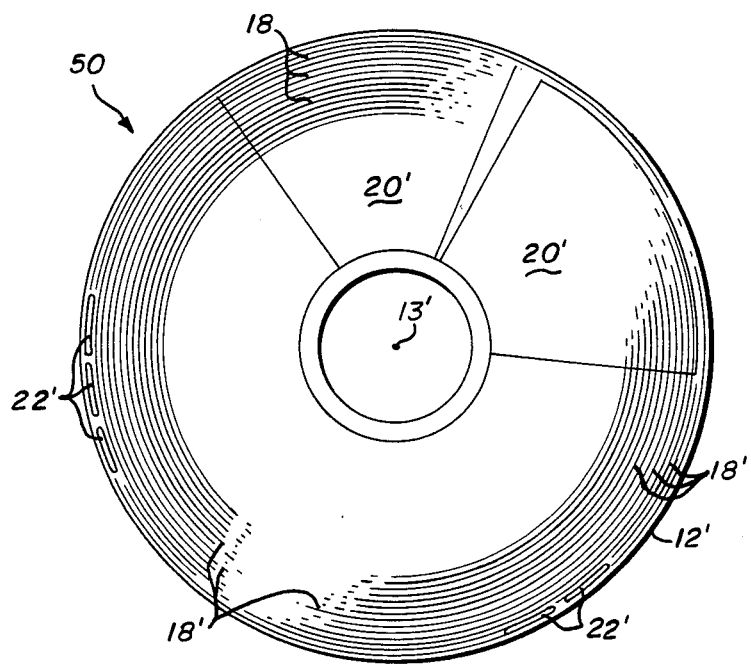
Fig_3

MULTIPLE SYSTEM DISK

BACKGROUND OF THE INVENTION

1. Field of the Invention

The present invention relates generally to flexible magnetic storage media, and more particularly to flexible disk storage media formatted to contain programming operable on more than one computer.

2. Description of the Prior Art

In recent years, there has been a surge in the popularity of the personal or microcomputer. Such computers are currently being utilized in a variety of applications in the home, business, scientific and educational environments. Uses for these personal computers range from entertainment such as games to sophisticated data processing applications. The current demand for personal computers has spurred development of various different types, each with its own software requirements.

Application programs and external data storage are generally encoded onto flexible disk storage media. These disk storage media typically comprise a thin base film substrate of a flexible material such as polyethylene teraphthalate overlayed by a layer of magnetic recording material such as ferric oxide. The disk portion which is recorded upon typically constitutes an area extending from the outer perimeter to approximately two-thirds of the distance to the disk axis and includes a series concentrically arranged data tracks. These tracks are arbitrary concentric portions which the computer is adapted to recognize and read.

The magnetic recording layer itself comprises a plurality of magnetic particles whose orientation is random within a binder. These particles comprising the magnetic layer possess magnetic domains, which are randomly oriented in the absence of a magnetic field. When a field is applied by a read/write head, the magnetic domains become oriented parallel to the lines of force of the applied field. A change in the field creates a magnetic flux reversal, which is the means by which data is stored. Correspondingly, data is read from the disk by inducing a current in the read/write head by passing the head over such a flux reversal. A series of flux reversals results in a binary sequence, which may then be interpreted by the computer according to a set of instructions given it.

A five and one-quarter inch diameter flexible disk contains approximately forty data tracks and may be divided, for indexing purposes, into various angular sectors. Each sector must contain an appropriate computer language code series to signify its existence to the computer. This code series is known as a header, and the process by which the disk is divided into individually identified sectors is known as formatting. Formatting the disk simplifies storing and accessing physically or logically related or unrelated sets of information or data. For example, a popular video game program may occupy only a fraction of the available storage space. By formatting the disk, several games may be stored on a single disk, and each can be individually accessed. The personal computers currently commerically available each contain their own hardware/software operating systems which may interpret a binary sequence differently. As a result data written on a disk through one computer cannot be read from the disk by another and each disk must be formatted to contain programming compatible with the appropriate target computer. None of the prior art addresses the problem of formatting a single flexible disk for use with multiple computer systems of different compatibilities.

U.S. Pat. No 4,377,825 issued to Kasubichi, et al., discloses an apparatus for interfacing with an ordinary pocket calculator to give it external information storage capabilities. U.S. Pat. No. 4,366,511 issued to Ranalli describes a method and apparatus for formatting a memory disk. The method of Ranalli is directed to formatting multiple headers on a single disk, and is not a multiple system formatting method. U.S. Pat. No. 4,298,897 issued to Arter, et al., discloses a means for increasing track density of a magnetic recording medium by recording narrower tracks. U.S. Pat. No. 3,226,700 issued to Miller describes a method for referencing and accessing serially recorded data.

In view of the prior art, there remains a need for a disk storage medium a method for recording information on the disk storage medium which may be read by more than one computer system.

SUMMARY OF THE PRESENT INVENTION

It is therefore an object of the present invention to provide an improved data storage disk which may be used with more than one type of computer.

It is a further object of the present invention to provide a data storage disk which provides for a cost effective means of distributing software which performs the same function on more than one type of computer.

It is another object of the present invention to provide a means for providing copy protecting software on a data storage disk.

Briefly, a preferred embodiment of the present invention includes a flexible disk comprising a base film substrate and at least one magnetic recording layer bonded to the substrate. An annular portion of the disk includes a plurality of data recording tracks. These tracks are concentrically arranged sectors on the disk. In a typical flexible disk, there are approximately forty data tracks. The disk is further divided into arbitrarily designated, angularly divided sectors in which the first data track, designated the zero track, contains encoded header information directing the different target computers to recognize the sector as its initial sector. Each sector further contains encoded information directing the computer, once it has recognized the target sector as its own initial sector, to jump to a particular grouping of data tracks.

A process for making the disk of the present invention includes selecting a plurality of target computers for which software is to be provided. It is then determined which particular series of encoded information each target computer will recognize. The zero track is then divided into quadrants, the number of which is equal to the number of target computers which will utilize the disk. The zero track portion in each quadrant is then encoded with the header allowing the target computer to recognize it. Following the header is information directing the computer to a particular plurality of data tracks located elsewhere on the tracked portion of the disk. Data, formatted for each individual target computer, is then placed upon the appropriate group of data tracks. The disk is then duplicated using standard duplication equipment.

It is an advantage of the present invention that one disk may be utilized by various different target computers.

It is a further advantage of the present invention that the disk provides an exceptionally cost effective means of distributing software which performs the same function on more than one machine.

It is another advantage of the present invention that the method may be used to provide copy protected disks.

It is a further advantage of the present invention that the disk is ideally suited for use as a software demonstration disk.

It is a further advantage of the present invention that the multiple system disk will simplify inventory control and economic forecasting for both retailers and wholesalers.

These and other objects and advantages of the present invention will no doubt become apparent to those skilled in the art after having read the following detailed description of the preferred embodiment which is illustrated in the various drawing figures.

IN THE DRAWING

FIG. 1 is a top view of a flexible magnetic recording disk of the present invention;

FIG. 2 is a schematic diagram illustrating the circuitry involved in reading the disk of FIG. 1; and FIG. 3 is a top view of an alternative embodiment of the present invention.

DETAILED DESCRIPTION OF THE PREFERRED EMBODIMENT

FIG. 1 illustrates a disk of the present invention and referred to by the general reference character 10. Disk 10 includes a circular base film substrate 12 having an axis 13 and coated with a layer of magnetic recording material 14. It should be recognized that double sided recording is common and can be utilized with the disk 10 by providing the disk 10 with a pair of magnetic recording layers 14. A plurality of data tracks 18 are located about a portion of the disk 10 comprising approximately the outer radial two-thirds of the surface area. The tracks 18 are concentrically arrayed and are approximately one and one-half mils wide for a forty-eight tracks-per-inch (TPI) disk. The tracks are sequentially numbered, with the first or zero track on the outside and the highest numbered track, usually track 40, located closest to axis 13. It should be noted that other numbers of tracks, for example, eighty, and other track densities, for example 96-TPI or higher, are used in the art and all are consistent with the present invention. Disk 10 is further divided into a plurality of pie-shaped angular sectors 20 bounded by radial lines projecting from the axis 13. The sectors 20 and tracks 18 are schematically illustrated in FIG. 1, which also shows a read/write head 21 positioned over the disk 10. The process of dividing a disk into sectors and tracks is known as formatting. Each sector 20 is provided with an initial string of identifying recorded information, known as a header 22, to enable a computer 30, illustrated in FIG. 2, to recognize each sector. The identifying track containing the headers is usually the outermost, or zero track. For example, the disk 10 is designed to be compatible with four personal computer systems: the Atari ®, the Commodore ®, the Apple ®, and the IBM ® PC, each of which has its own unique recognition requirements. The disk 10, accordingly, is subdivided into four sectors 20 with each sector 20 having a header 22 carrying the appropriate recognition information for one of the four computers. Compatibility of the disk 10 is not limited, either in type or number to these four computers, but may be produced with a variety of header and program combinations. The only fixed limitation is the physical storage space of the disk 10, which may limit the number of different computers 30 with which disk 10 may be utilized.

The specific machine recognition sectoring is done on the track to which each machine is hard-wired to look for its recognition data. For the current Atari ®, Apple ® and IBM ® machines this is the zero track and for the Commodore ® it is track sixteen. The remaining tracks 18 are allotted to the four computers based upon the track's radial location, and may be sectored according to the program requirements. Thus, the data which the computer is to process is located on the remaining thirty-nine tracks. These data tracks are accessed by each computer 30 through its initial recognition sector on the zero track by a "boot routine." A boot routine is the program that is first found by a computer when it starts to read a disk. Each computer 30 has hard wired instructions directing it to look for a particular encoded header 22, usually in the zero track, which the machine recognizes and interprets as an initial sequence. Through the read/write head 21, the computer 30 loads the contents of the header 22 into data memory 32 by operation of a central processing unit (CPU) 34. In accordance with instructions from the CPU 34 and mediated by a logic means 35, the data is executed and the read/write head 21 is directed to step out to its own data track set located elsewhere on the disk 10.

Disk 10 has one header 22 for each of the four target computers 30. Each header 22 consists of approximately twenty bytes of information and contains a boot program to direct the computer 30 to its data stored elsewhere on the disk 10.

A method for making the multiple system disk 10 is as follows. Each target computer is designed with a particular code format which the machine uses to interpret a given binary sequence. These code formats include Frequency Modulation (FM), used by the IBM ® PC, Modified Frequency Modulation (MFM), used by the Atari ®, and Group Code Recognition (GCR), used by the Apple ® and the Commodore ® computers. Each computer's particular code is known and a recognition series, utilizing that code, is developed for each. This code will be placed in the initial or boot track, typically track zero. Along with this recognition code, a system program is developed to cause the read/write head 21 of each computer 30 to boot and step to a preselected data track portion 18 of the disk 10. The recognition and boot information are placed in discrete headers 22, angularly displaced about the zero track. The data tracks 18 are similarly divided into discrete concentric sections and allotted to each machine 30. This is done simply by modifying the directories of the disk 10, as is known in the art, which the program is to be written onto.

The recognition and boot information must be placed on the zero track such that each header 22 will occupy a discrete portion of the zero track and will not impinge on an adjacent header 22. This is complicated by the fact that the four target computers use three different code systems; thus the four headers are more easily written in multiple passes.

The preferred method of writing the headers is to use one code system as a template, formatting the entire track and then rewriting the remaining systems' headers within the unused sector boundaries. This gives a structure to the zero track so that one system's data does not overrun the others. Other methods of writing the headers include but are not limited to re-encrypting one system's disk information, for example, Atari ®'s FM code, into another system's format, for example, IBM ®'s MFM code. Writing markers in one code that will be decipherable as data marks by another code system is an alternative method. For example, a D5 AA 96 pattern in MFM would be recognizable by an Apple ®, utilizing GCR code, as a data mark. The latter two procedures speed production of the disk 10 because only two writing passes are required. The various machine code formats are constructed and duplicated using an interface system which can specify any desired bit structure. An example of such an interface device using a 2900 model bit slice processor is manufactured by Foremaster, Inc. In this manner bit patterns can be encoded in a particular code format to result in readable data marks by computers using different code systems, even though such code formats may result in a code rule violation and thus could not be written by the target computer.

Once the header and track information is copied onto disk 10, the disk is duplicated using duplication procedures known in the art.

The following is a specific example of a process for creating a multiple disk 10 operable on the Apple ®, Atari ®, Commodore ®, and IBM ® PC computers. The method used is the re-encryption of one format into another.

First, a program is created for each of the different computers, using known programming techniques, which will boot the drive to preselected data tracks. For example, the data tracks may be allotted in accordance with the following protocol: tracks one to nine to the IBM ®, ten to nineteen to the Commodore ®, twenty to twenty-nine to the Apple ®, and tracks thirty to thirty-nine to the Atari ®. The boot programs for all but the Commodore ® will be placed at discrete angular intervals about the zero track. The FM code of the Atari ® is translated into the MFM format of the IBM ®. Two sectors may now be laid down, including header and track information in MFM format, each of which will be recognizable by one computer. The GCR code utilized by an Apple ® is very different from the FM and MFM code formats, thus a lengthy data pattern cannot be directly translated into MFM. Instead of an entire sector, only a header, in MFM, is placed on the zero track. This header is recognizable by the Apple ® and serves to boot the drive to the data tracks, which are encoded normally in GCR. The Commodore computer also utilizes GCR, but with a different encoding technique; thus, the Commodore ® and Apple ® codes are not compatible. The Commodore ® computer, however, is hard wired to look for its boot sector on track 16 rather than the zero track. Thus, the Commodore ® boot sector may be laid down at the same time the data is placed on its designated tracks.

The data tracks, carrying, for example, a game, are then placed on the preselected tracks in accordance with the computer's code format. Minor modifications may be necessary to the game program to accommodate the decreased storage area. The disk is then duplicated as known in the art.

The disk 10 may then be utilized with any one or more of the four machines by inserting the disk 10 into the drive. The read/write head 21 will automatically find its initial boot sector according to the instructions within the program memory 36. The information encoded into the boot header will be loaded into the data memory 32 and executed. The loaded information will direct the read/write head 21 to step out to its own data, and the program will be run accordingly.

An alternative embodiment of the present invention is illustrated in FIG. 3 and designated by the general reference character 50. Those elements of the disk 50 which are common to those of the disk 10 carry the same reference numeral distinguished by a prime designation. The disk 50 includes a plurality of concentrically arrayed data tracks 18', and is divided into a plurality of angular sectors 20'. The disk 50 is a copy-protected disk which utilizes the multiple system process to create a plurality of headers 22', at least one of which is recognizable by virtually any existing computer. The headers 22' may be placed about the track or tracks 18' of the disk 50 where each computer starts its boot activity. Typically, this is the outermost track 18' designated the zero track, although in a few instances other tracks are used. The remaining tracks 18' are reserved for data, which is written on the tracks 18' for the individual computer with which each disk 50 will be used. The data is recorded by any means known in the art. Each header 22' includes a preselected "signature" comprising a particular binary series which only the target computer will recognize. Essentially, all floppy disks currently being utilized are formatted in one of the following combinations: 128, 256, 512 or 1024 byte sector size, FM, MFM, or GCR codes and 48 TPI or 96 TPI track density. This results in twenty-four possible combinations of sector size, code and track density. The disk 50 includes twenty-four headers 22' which collectively encompass all possible formatting combinations, with the same 22'. This results in a disk 50 which includes a copy protected header 22' which may be utilized with virtually any computer.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

We claim:

1. A magnetic information storage system comprising
    a flexible disk storage medium including a base film substrate and at least one magnetic recording layer suitable for recording a plurality of separate tracks;
    a plurality of headers on at least one of said tracks, each of the headers occupying a discrete angular portion of the disk and carrying an encoded sequence readable by only one of a plurality of target computers, said sequence comprising directions to the computer to load the encoded information and further to step out and to process a plurality of data tracks located elsewhere on the disk.

2. The magnetic information storage system of claim 1 wherein
    three headers are located on an outermost track, and a fourth header is located on an intermediate track; and
    a plurality of tracks comprise data tracks for containing information to be utilized by each of said target computers, said data tracks being divided into a plurality of approximately equal blocks whereby each computer may access its own individual data block.

3. The information storage system of claim 1 including twenty-four headers, angularly disposed about the disk with one header for each possible combination of 128, 256, 512 and 1024 byte-length sectors, with FM, MFM, and GCR coding formats, and with 48 and 96 TPI track densities, each header having magnetically encoded information constituting a signature whereby a computer reading the disk may be instructed to not load the information contained thereon unless the signature is present.

4. A flexible disk storage medium adapted to be read by more than one type of computer comprising a base film substrate;

at least one magnetic recording layer deposited on said substrate and adapted for recording information in a plurality of concentrically-arrayed and angularly sectored tracks with a zero track located near the outer perimeter of the disk;

a plurality of headers placed at discrete angular intervals about said tracks, each header having a specific code format; and a plurality of data track groups, equal in number to the number of headers and each containing data encoded in the same code format as the header.

5. The disk medium of claim 4 including four angularly disposed data sectors and headers, three of said headers being disposed about a zero track and a fourth being disposed about an intermediate track, and a plurality of data tracks apportioned approximately equally into four geometrically discrete sets thereof, each set of data tracks being informationally linked with a header.

6. The disk medium of claim 5 wherein the specific code formats include FM, MFM and GCR.

7. In a flexible disk magnetic recording medium including a base film substrate layer and a magnetic recording layer having a plurality of concentrically arrayed data tracks, the improvement comprising:

at least two angularly disposed data sectors each containing a header comprising a unique series of encoded signals capable of being recognized by a specific type of computer, each of said headers further including a series of encoded signals comprising an instruction directing said computer to a set of data tracks located elsewhere on the disk, whereby said disk may be read by at least two computers each recognizing its own unique header and data tracks.

8. The disk medium of claim 7 including four angularly disposed data sectors and headers, three of said headers being disposed about an outermost track and a fourth being disposed on an intermediate track, said remaining tracks comprising data tracks and apportioned approximately equally into four geometrically discrete sets thereof, one set for each of four target computers.

9. A process for making a flexible magnetic storage medium adapted for use with a plurality of target computers, comprising (a) assigning a set of data tracks for each of a plurality of target computers, said data tracks comprising discrete concentric portions of the disk;

(b) constructing a boot program for each of said target computers, directing said computer to its own assigned set of data tracks;

(c) partitioning a boot track for each of said target computers, said boot track containing the boot program, each of said target computers having a discrete portion of the boot track;

(d) writing the boot track onto the disk;

(e) writing the desired program onto the data portion of the disk, each of said target computers having its own data portion written in said computer's particular code format; and (f) duplicating the disk.

10. The process according to claim 9 wherein the particular code formats include FM, MFM and GCR.

11. The process of claim 9 wherein there are four target computers; and a first boot track for three of said target computers is located about a zero track of said disk, and a second boot track for said fourth computer being located about an intermediate data track.

12. The process of claim 9 wherein said partitioning of the first boot track is done by using a first code system as a template, formatting the entire boot track with said system, and subsequently writing the other systems' codes in the unused portion of said first code's boundaries.

13. The process of claim 9 wherein said partitioning of the first boot track is done by encrypting code information of a first code system into a second code system whereby said second code system can be utilized for two computer systems, said second code system being utilized to write said boot program for two of said three computer systems in one write pass, said third system being written on said boot track on a subsequent write pass.

14. The process of claim 9 wherein said partitioning of the first boot track is done by encrypting code information of a first and second code system into a third code system whereby said third code system can be utilized to write all three boot programs contained in said first track.

* * * * *